United States Patent
Gant et al.

(10) Patent No.: US 10,988,365 B2
(45) Date of Patent: Apr. 27, 2021

(54) BEVERAGE DISPENSING MACHINE FOR ACHIEVING TARGET POURS FOR DIFFERENT BEVERAGES

(71) Applicant: Accenture Global Solutions Limited, Dublin (IE)

(72) Inventors: Evan Isaac Timerding Gant, Medford, MA (US); Christopher J. McClellan, Grove City, OH (US); Brian Cherbak, San Francisco, CA (US); Andrew Turner Kriebel, San Francisco, CA (US); Kyle Andrew Tucker, Hendersonville, NC (US); Amy Eleanor Loomis, San Francisco, CA (US); James Patrick McCabe, Jr., San Francisco, CA (US); Jaewon Sam Kang, Oakland, CA (US); Gregory T. Schulte, Oakland, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/984,944

(22) Filed: Aug. 4, 2020

(65) Prior Publication Data

US 2021/0002120 A1   Jan. 7, 2021

Related U.S. Application Data

(63) Continuation of application No. 16/804,168, filed on Feb. 28, 2020, now Pat. No. 10,947,103.

(Continued)

(51) Int. Cl.
*B67D 1/08* (2006.01)

(52) U.S. Cl.
CPC ......... *B67D 1/0894* (2013.01); *B67D 1/0888* (2013.01)

(58) Field of Classification Search
CPC ........................... B67D 1/0894; B67D 1/0888
See application file for complete search history.

(56) References Cited

U.S. PATENT DOCUMENTS

| 5,722,526 A | 3/1998 | Sharrard |
| 6,109,524 A | 8/2000 | Kanoh et al. |

(Continued)

FOREIGN PATENT DOCUMENTS

| JP | 2003221098 | 8/2003 |
| WO | WO 03033397 | 4/2003 |

(Continued)

OTHER PUBLICATIONS

AU Office Action in Australian Appln. No. 2020204204, dated Aug. 24, 2020, 9 pages.

(Continued)

*Primary Examiner* — Jason K Niesz
(74) *Attorney, Agent, or Firm* — Fish & Richardson P.C.

(57) ABSTRACT

Implementations of the present disclosure are directed to dispensing beverages from a beverage dispensing machine and include determining, from computer-readable media, pour parameters for a beverage of a plurality of beverages, the pour parameters being specific to the beverage, at least one pour parameter including a tilt value, and automatically, by the beverage dispensing machine: rotating a drum that holds a vessel to achieve the tilt value, initiating dispensing of the beverage into the vessel from a tap, automatically rotating the drum to reduce the tilt value of the vessel during dispensing of the beverage, and ceasing dispensing of the beverage into the vessel from the tap, the tilt value being substantially zero upon ceasing.

20 Claims, 10 Drawing Sheets

Related U.S. Application Data

(60) Provisional application No. 62/865,422, filed on Jun. 24, 2019.

(56) References Cited

U.S. PATENT DOCUMENTS

| | | |
|---|---|---|
| 6,711,465 B2 | 3/2004 | Tomassi |
| 8,655,732 B1 | 2/2014 | Wilinski et al. |
| 10,252,900 B2 | 4/2019 | Cook |
| 10,726,246 B1 | 7/2020 | McClellan et al. |
| 2002/0087413 A1 | 7/2002 | Mahaffy et al. |
| 2004/0069590 A1 | 4/2004 | Corrick et al. |
| 2006/0157152 A1* | 7/2006 | Wolski .............. B67D 1/0882 141/275 |
| 2007/0239565 A1 | 10/2007 | Pentel |
| 2009/0210240 A1 | 8/2009 | Benschop et al. |
| 2010/0078290 A1 | 4/2010 | Chang |
| 2011/0298583 A1 | 12/2011 | Libby et al. |
| 2011/0320037 A1 | 12/2011 | Frugone |
| 2016/0098882 A1 | 4/2016 | Holdych et al. |
| 2016/0155127 A1 | 6/2016 | Hartman |
| 2016/0379287 A1 | 12/2016 | Dabiri |
| 2018/0029859 A1 | 2/2018 | Hevia et al. |
| 2019/0050921 A1 | 2/2019 | Ryner et al. |
| 2019/0206174 A1 | 7/2019 | Miu et al. |
| 2019/0251562 A1 | 8/2019 | Dabiri |
| 2019/0340418 A1 | 11/2019 | Zecchini et al. |
| 2020/0399111 A1 | 12/2020 | Gant et al. |
| 2020/0401792 A1 | 12/2020 | McClellan et al. |

FOREIGN PATENT DOCUMENTS

| | | |
|---|---|---|
| WO | WO 2007076584 | 7/2007 |
| WO | WO 2017098289 | 6/2017 |
| WO | WO 2018236758 | 12/2018 |

OTHER PUBLICATIONS

AU Office Action in Australian Appln. No. 2020204186, dated Jul. 28, 2020, 11 pages.

Scott [online], "Buying Draft Beer from a Vending Machine in Japan", Youtube, May 17, 2013, retrieved on Jan. 27, 2020, <https://www.youtube.com/watch?v=JNLW5vgKNw8>, 1 page [Video Submission].

* cited by examiner

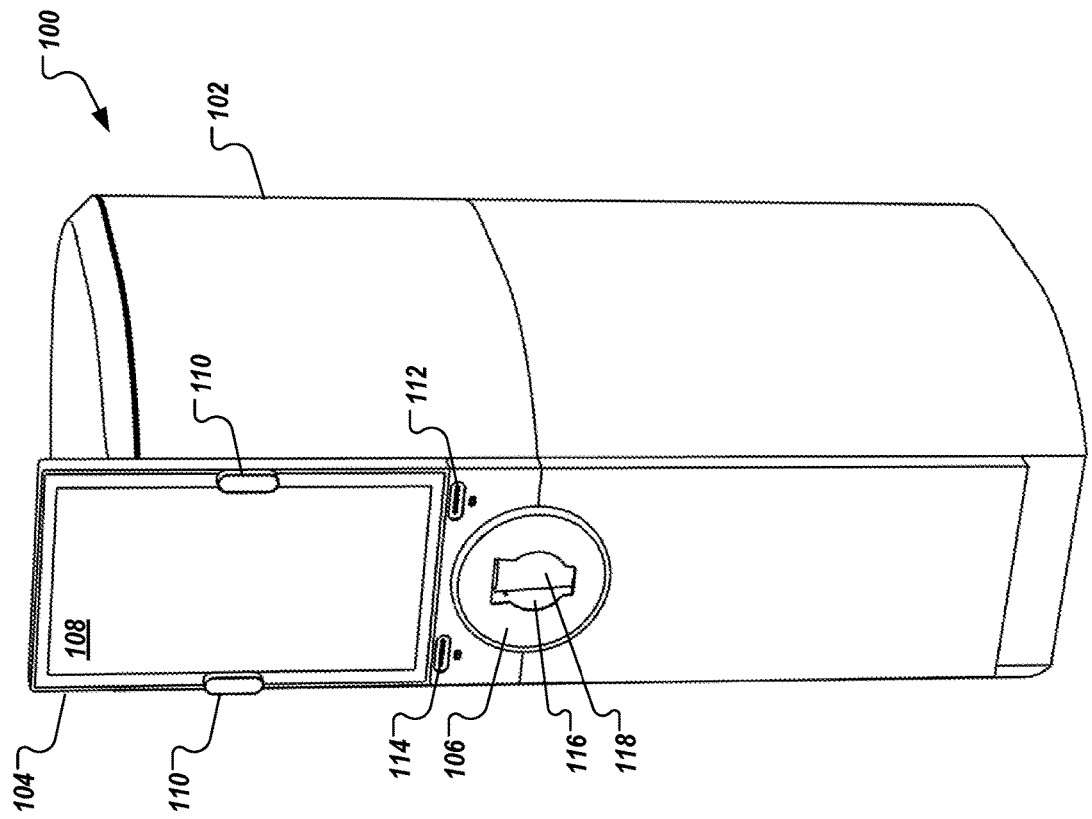
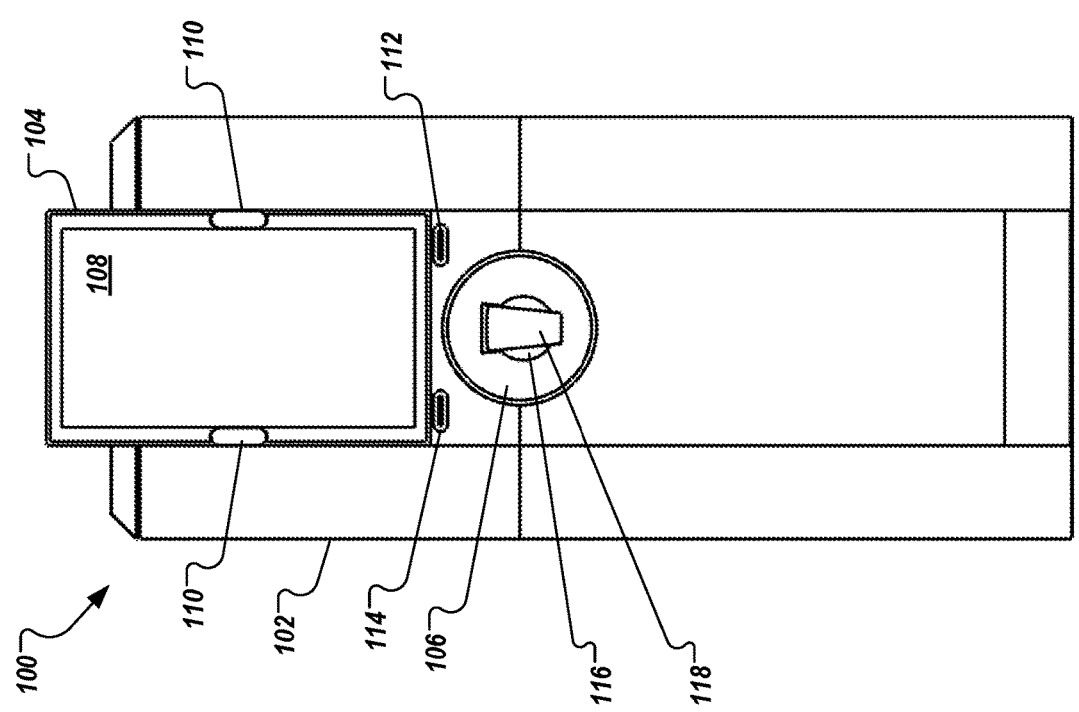

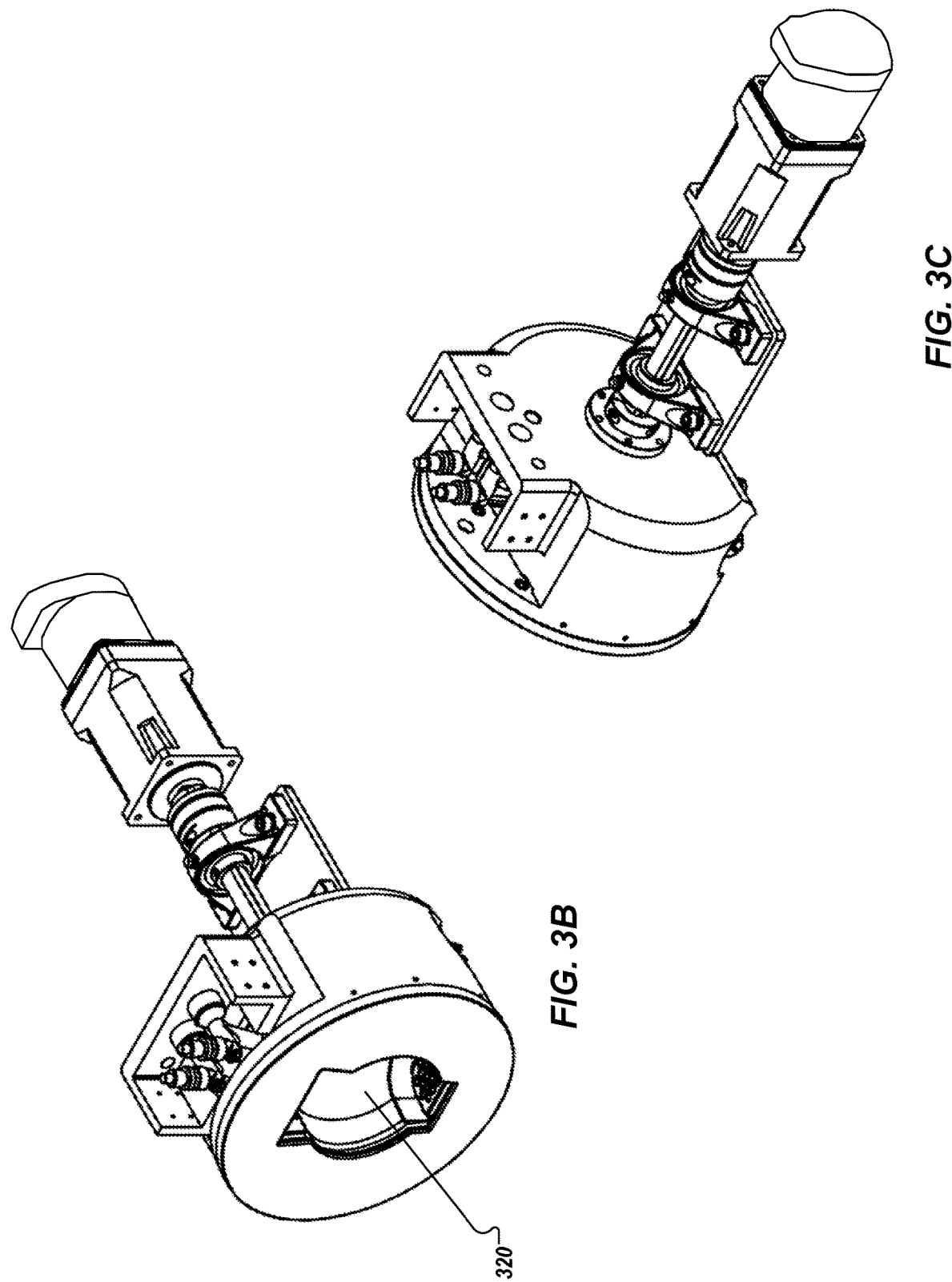

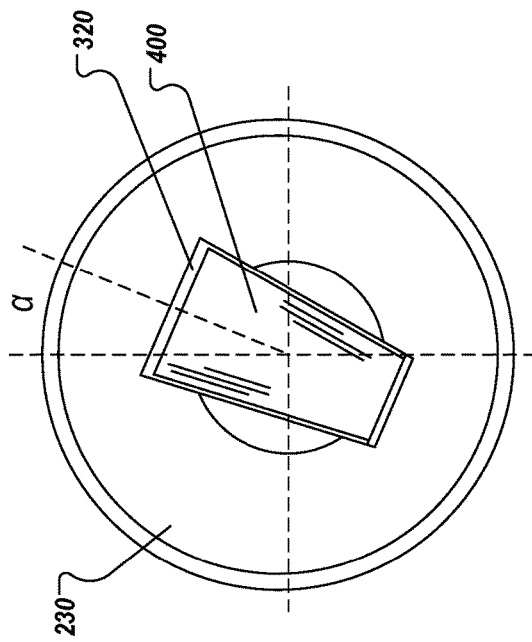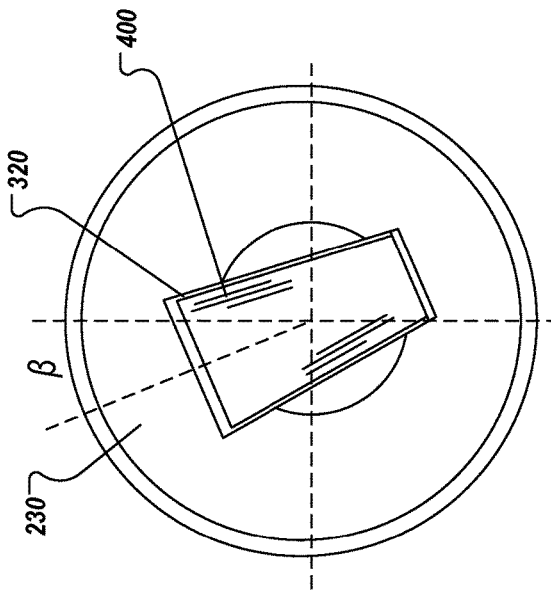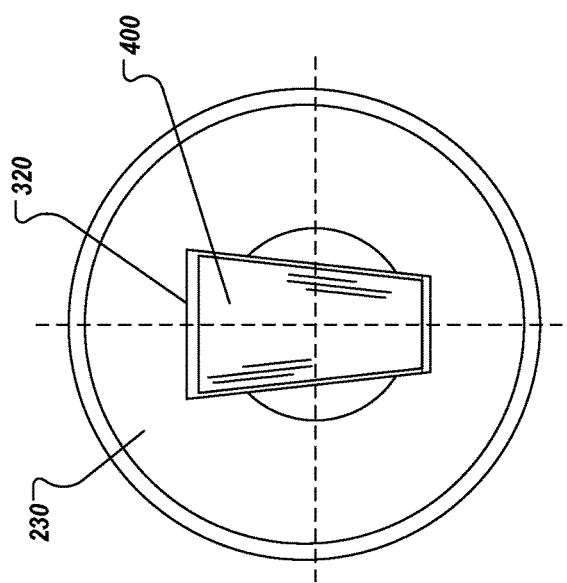

BEVERAGE DISPENSING MACHINE FOR ACHIEVING TARGET POURS FOR DIFFERENT BEVERAGES

CROSS-REFERENCE TO RELATED APPLICATIONS

This application is a continuation application of and claims priority under 35 U.S.C. § 120 to U.S. application Ser. No. 16/804,168, filed on Feb. 28, 2020, which claims the benefit of and priority to U.S. Provisional Application No. 62/865,422, filed on Jun. 24, 2019, and entitled "BEVERAGE DISPENSING MACHINE FOR ACHIEVING TARGET POURS FOR DIFFERENT BEVERAGES," the disclosure of each of which are expressly incorporated herein by reference.

BACKGROUND

Dispensing machines have been developed for dispensing liquids, such as beverages. Different types of beverages have different characteristics and should be stored and dispensed in respective manners to achieve delivery of the beverage in a satisfactory manner. A satisfactory manner can include, for example and without limitation, serving the beverage at an appropriate temperature, at an appropriate pour, at an appropriate carbonation level (e.g., not over-carbonated, not under-carbonated (flat)) and a correct amount of head, such that the flavor, aroma, and visual presentation of the beverage is as intended.

Traditional beverage dispensing machines provide for storage of beverages and means for filling of a vessel with a beverage in a relatively consistent manner across various types of beverages. Some dispensing machines are automated and provide the same delivery parameters (e.g., pour parameters) regardless of the beverage being served. In non-automated dispensing systems, the quality of delivery of the beverage is susceptible to the particular person using the dispensing machine. Further, traditional beverage dispensing machines deliver beverages into a vessel that is either set in an upright position or is held by a person. Consequently, traditional beverage dispensing machines dispense beverages in a sub-optimal manner for respective beverage types.

SUMMARY

Implementations of the present disclosure are generally directed to beverage dispensing machines. More particularly, implementations of the present disclosure are directed to a beverage dispensing machine for achieving target pours for different beverages.

In some implementations, actions for dispensing beverages from a beverage dispensing machine include determining, from computer-readable media, pour parameters for a beverage of a plurality of beverages, the pour parameters being specific to the beverage, at least one pour parameter including a tilt value, and automatically, by the beverage dispensing machine: rotating a drum that holds a vessel to achieve the tilt value, initiating dispensing of the beverage into the vessel from a tap, automatically rotating the drum to reduce the tilt value of the vessel during dispensing of the beverage, and ceasing dispensing of the beverage into the vessel from the tap, the tilt value being substantially zero upon ceasing. Other implementations of this aspect include corresponding systems, apparatus, and computer programs, configured to perform operations and actions of methods, encoded on computer storage devices.

These and other implementations can each optionally include one or more of the following features: the pour parameters further include a flow rate and the beverage is dispensed substantially at the flow rate; the pour parameters further include a variable flow rate and the beverage is dispensed substantially at the variable flow rate; the drum rotates in a first direction for any beverage dispensed; the drum rotates in a first direction for a first beverage that is dispensed and rotates in a second direction for a second beverage that is dispensed, the second direction different from the first direction; actions further include providing data used to determine features of the beverage of the beverage and adjusting one or more pour parameters based on at least one feature; and the one or more pour parameters are adjusted during dispensing of the beverage.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations of the present disclosure can include any combination of the aspects and features described herein. That is, implementations of the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

FIGS. 1A-1C depict a beverage dispensing machine in accordance with implementations of the present disclosure.

FIGS. 3A-3C depict an example drive assembly in accordance with implementations of the present disclosure.

FIGS. 4A-4C depict example rotation of a drum in accordance with implementations of the present disclosure.

Like reference numbers and designations in the various drawings indicate like elements.

DETAILED DESCRIPTION

Figure 1C:
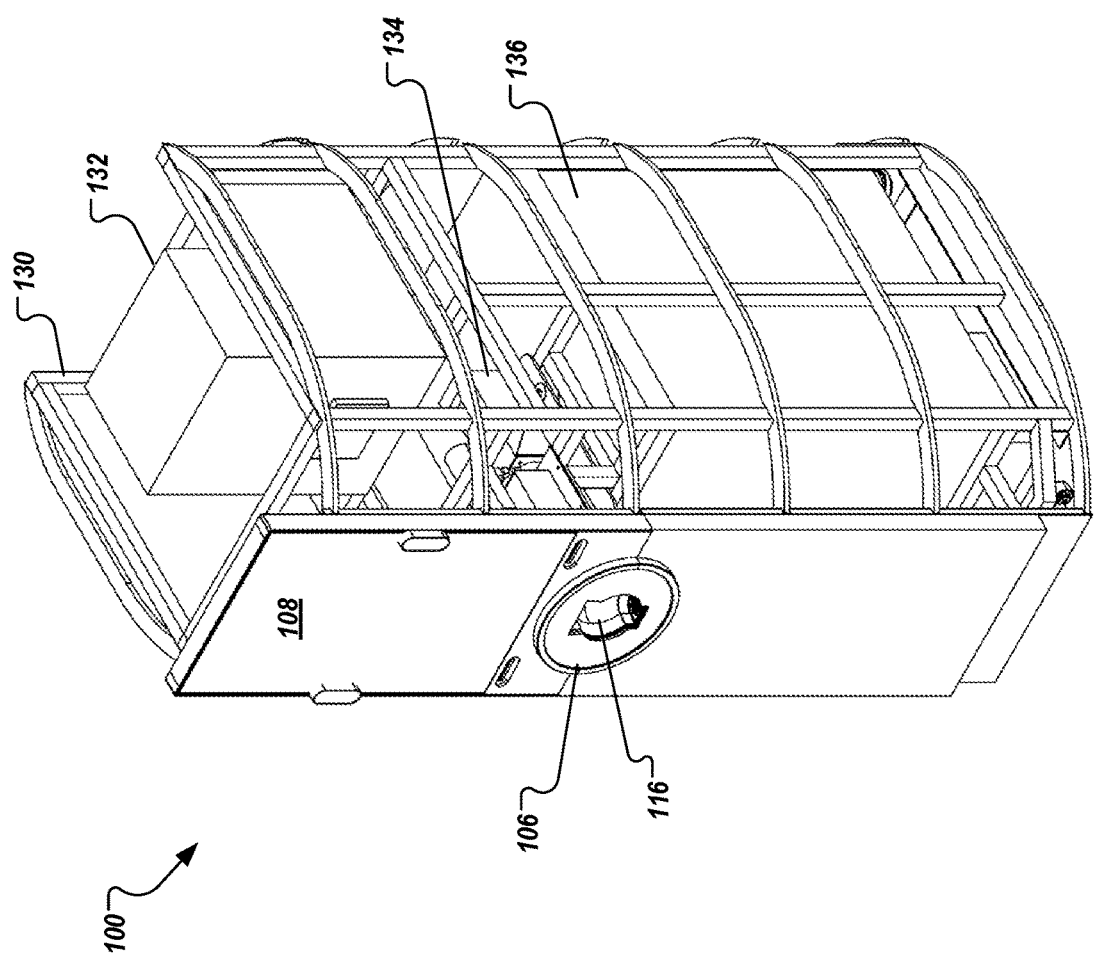

Implementations of the present disclosure are generally directed to beverage dispensing machines. More particularly, implementations of the present disclosure are directed to a beverage dispensing machine for achieving target pours for different beverages. In some implementations, actions for dispensing beverages from a beverage dispensing machine include determining, from computer-readable media, pour parameters for a beverage of a plurality of beverages, the pour parameters being specific to the beverage, at least one pour parameter including a tilt value, and automatically, by the beverage dispensing machine: rotating a drum that holds a vessel to achieve the tilt value, initiating dispensing of the beverage into the vessel from a tap, automatically rotating the drum to reduce the tilt value of the vessel during dispensing of the beverage, and ceasing dispensing of the beverage into the vessel from the tap, the tilt value being substantially zero upon ceasing.

Implementations of the present disclosure are described in further detail with reference to an example beverage. The example beverage includes beer, of which there are various types. Example types of beer include, without limitation, lagers, light lagers, pale lagers, pilsners, dark lagers, American pales ales, Indian pale ales (IPAs), English pales ales, and stouts. It is contemplated, however, that implementations of the present disclosure can be realized for any appropriate beverage (e.g., champagne, soda).

In the example context, different beers have different characteristics. The characteristics of a beer can affect the service of the beer. That is, the service of beer should be appropriate for the type of beer, such that the beer is served in a satisfactory manner. A satisfactory manner can include serving the beer at an appropriate temperature, at an appropriate pour, and a correct amount of head, such that the flavor, aroma, and visual presentation of the beer is as intended. With regard to temperature, for example, lagers and light lagers should be served in a range of 33-40° F., and preferably in a range of 36-38° F., pale lagers and pilsners should be served in a range of 38-45° F., and preferably in a range of 40-42° F., dark lagers and American pale ales should be served in a range of 45-50° F., and English pale ales should be served in a range of 50-55° F.

With regard to pour, pour parameters such as pour rate, angle and gas settings impact service of beer in a satisfactory manner. Target pour parameters can be different for different types of beers. For example, pouring a beer into a vessel (e.g., glass) at an angle mitigates turbulence in the pour and release of gases to achieve a target head (e.g., a layer of foam formed at the top of the beer). Achieving a target head releases the beer's aromatics and adds to the overall visual presentation and taste of the beer. The angle of the vessel during at least a portion of the pour can be within a range of 30° to 50° relative to vertical and is preferably in a range of 40°-45°. However, the appropriate angle can depend on the type of beer. For example, for a first type of beer, a steeper angle may be more appropriate than the angle for a second type of beer. During the pour, the vessel can be at an initial angle (e.g., 45°) and can gradually tilt to a final angle (e.g., 0° relative to vertical, 90° relative to horizontal) by the end of the pour. In this manner, turbulence is mitigated during the progression of the pour from start to finish. Further, the pour can target the middle of a slope of the vessel to mitigate turbulence in the pour and achieve a desirable head.

In general, beer is served as so-called draft beer from taps (also referred to as faucets) in a closed system. Because a draft beer system is a closed system, settings input to the system effect the resulting pours from the system. Correct setting of regulators (e.g., carbon dioxide ($CO_2$) gauges) will prevent both over- and under-carbonation. The setting can vary based on type of beer and/or how long the beer has been waiting to be served since tapped. For example, for ales (e.g., pale ales, IPAs, ambers) that have a carbonation volume in a range of 2.1 to 2.6, the regulator should be set within a range of about 7 to 13 PSI. For lagers, a range of 10 and 14 PSI is appropriate, while light pilsners require a range of 11 to 16 PSI. Wheat beers, Belgian beers, and common American sours are generally the most carbonated beers, requiring about 15 to 20 PSI. For stouts, nitrogen ($N_2$) is used, along with a stout faucet, and a nitrogen regulator should be set in a range of about 35 to 38 PSI.

Traditional beverage dispensing machines provide for filling of a vessel with a beverage in a relatively consistent manner across various types of beverages. That is, the same delivery parameters (e.g., pour parameters) are used regardless of the beverage being served. Further, traditional beverage dispensing machines deliver beverages into a vessel that is either set in an upright position or is held by a consumer. Consequently, traditional beverage dispensing machines dispense beverages in an inconsistent and/or suboptimal manner for respective beverage types.

In view of this, and as described in further detail herein, implementations of the present disclosure are directed to a beverage dispensing machine for achieving target pours for different beverages.

FIGS. 1A and 1B depict a beverage dispensing machine 100 in accordance with implementations of the present disclosure. The beverage dispensing machine 100 includes a housing 102, an interface 104, and a beverage dispenser 106. As described in further detail herein, the housing 102 houses devices, systems, and beverages that can be dispensed to consumers through the beverage dispenser. For example, the housing 102 can house, without limitation, one or more computing devices, a refrigeration system, one or more beverage reservoirs (e.g., kegs, boxes, bottles), and a beverage dispensing system (e.g., lines, taps, pressure source).

In the example of FIGS. 1A and 1B, the interface 104 includes a display screen 108 and one or more cameras 110. In some implementations, the display screen 108 displays one or more user interfaces (UIs) that enable a consumer to interact with the vending machine 100. In some examples, the display screen 108 is provided as a touchscreen that displays one or more UIs and that is responsive to user input (e.g., the consumer touching the display screen 108). In this manner, the consumer can provide touch input to the vending machine 100 through the display screen 108 to, among other things, make a selection, input information, and review beverage options. In some examples, each of the one or more cameras 110 is a digital camera that generates digital images. Although multiple cameras 110 are depicted in the example of FIGS. 1A and 1B, implementations of the vending machine 100 can be realized with a single camera 110. In some examples, a camera 110 can include, without limitation, a still camera, a video camera, an infra-red (IR) camera, or any appropriate camera. In some examples, the single camera 110 includes combined capabilities (e.g., combined still, video, and IR camera). In some examples, multiple cameras 110 are provided. For example, a first camera 110 can include first capabilities (e.g., still, video), and a second camera can include second capabilities (e.g., IR).

Although not depicted in FIGS. 1A and 1B, the beverage dispensing machine 100 can include one or more microphones for generating audio data. In some examples, the interface 104 can include one or more microphones. For example, at least one camera 110 of the one or more cameras 110 can include a microphone.

In the example of FIGS. 1A and 1B, the beverage dispensing machine 100 includes an identification (ID) scanner 112 and a card reader 114. In some examples, the ID scanner 112 scans a form of identification (e.g., a residence card, a driver's license, a passport) that records consumer-specific information. Example consumer-specific information can include, without limitation, one or more identification images (e.g., facial image, fingerprint image), name, address, date-of-birth (DOB), age, address, unique identifier (e.g., resident number, license number, passport number), and gender. In some examples, the identification records the consumer-specific information in analog form (e.g., printed on the identification) and/or digital form (e.g., digitally recorded in memory on the identification). In some examples, the ID scanner 112 scans the identification to determine at least a portion of the consumer-specific information. For example, the ID scanner 112 can record an image of the identification and can process the image (e.g., using optical character recognition, and/or image recognition) to determine one or more of the identification image(s), the name, the address, the DOB, the age, the address, the unique identifier, and the gender recorded on the identification. As another example, the ID scanner 112 can read a memory of the identification to retrieve one or more of the identification image(s), the name, the address, the DOB, the age, the address, the unique identifier, and the gender recorded on the identification.

In some examples, the card reader 114 reads payment information to remit payment for a beverage that is to be served by the beverage dispensing machine 100. In some examples, the card reader 114 is a traditional card reader that ingests a payment card (e.g., credit card, debit card, gift card) having payment information recorded thereon. Payment is facilitated as described in further detail herein. Although a card reader 114 is provided, it is contemplated that the beverage dispensing machine 100 can use any appropriate payment technique. Example payment techniques include, without limitation, card payment (e.g., credit card, debit card, gift card), near-field communication (NFC) payment (e.g., touch-to-pay), and machine-readable code payment (e.g., bar code, QR code scanning). In some examples, the beverage dispensing machine 100 enables consumers to select a payment technique from a set of payment techniques. In some examples, the card reader 114 is not included in the vending machine 100 (e.g., the vending machine 100 accepts only non-card payments (e.g., NFC payment, machine-readable code payment).

In the example of FIGS. 1A and 1B, the beverage dispenser 106 includes an opening 116 for receiving a vessel 118. In some examples, the opening 106 enables access to one or more taps that dispense a beverage into the vessel 118. In the depicted example, the vessel 118 is provided as a glass. It is contemplated, however, that any appropriate vessel can be used for receiving a dispensed beverage.

FIG. 1C depicts the vending machine 100 with the housing 102 removed. As depicted in FIG. 1C, the vending machine 100 includes a frame 130 that supports internal and external components and systems of the vending machine 100. For example, the frame 130 supports a computing unit 132, a drive assembly 134, and a beverage storage system 136. The computing unit 132 includes one or more computing devices and computer-readable/-writable memory. In some examples, the one or more computing devices execute one or more computer programs for operating the vending machine 100, as described herein. As described in further detail herein, the beverage dispenser 106 includes the drive assembly 134 for tilting a vessel during pouring of a beverage. As also described in further detail herein, the beverage storage system 136 stores and cools one or more beverages for delivery through the beverage dispenser 106.

Figure 2:
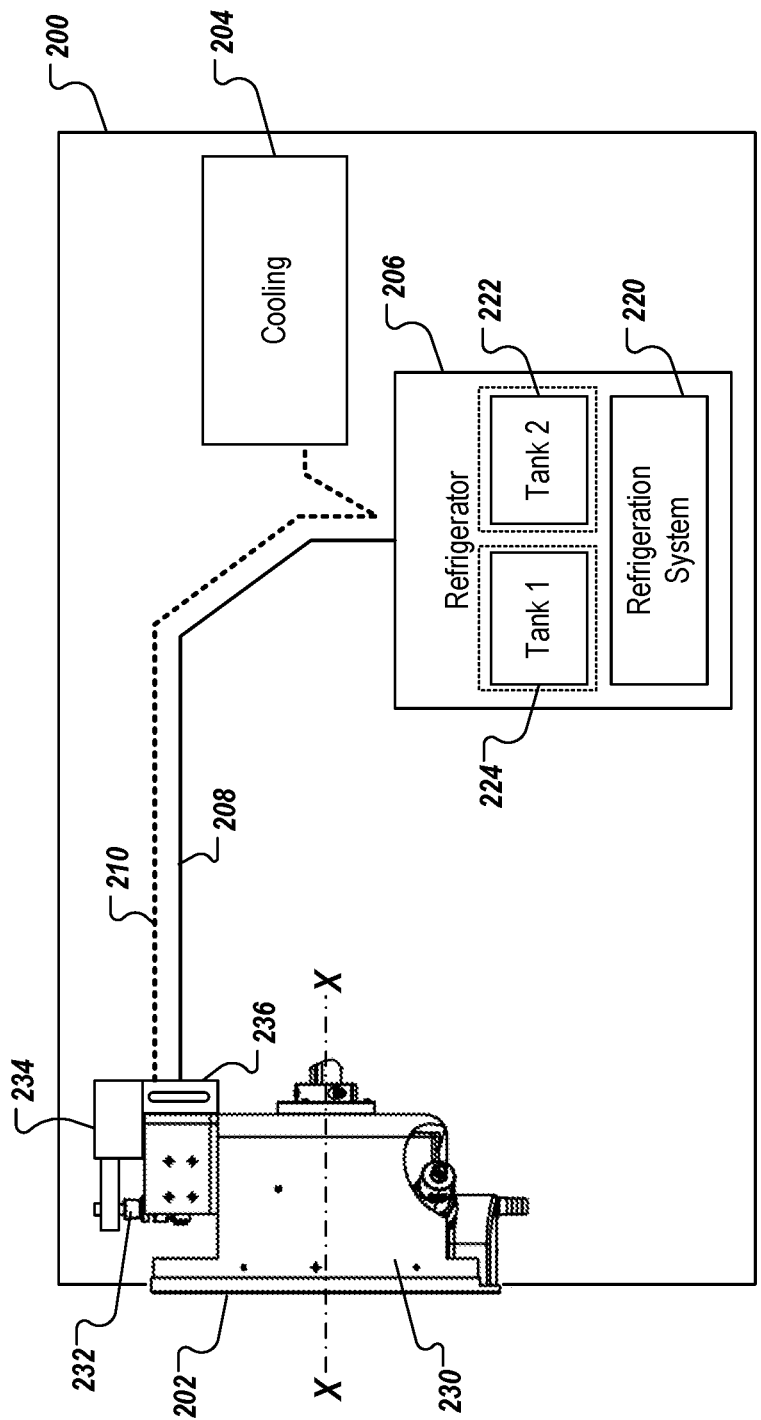
FIG. 2 depicts an example portion of the beverage dispensing machine in accordance with implementations of the present disclosure.

FIG. 2 depicts an example portion 200 of the beverage dispensing machine in accordance with implementations of the present disclosure. The example portion 200 includes a drum assembly 202, a cooling system 204, and a refrigerator 206. In some examples, the drum assembly 202 is part of the drive assembly 134 of the beverage dispenser 106. In accordance with implementations of the present disclosure, the refrigerator 206 stores one or more beverages therein and supplies the beverages to the drum assembly 202 for dispensing. To this end, one or more fluid lines 208 provide fluid communication between the refrigerator 206 and the drum assembly 202. In some implementations, the cooling system 204 provides cooling of the one or more fluid lines 208. For example, the cooling system 204 circulates cooling fluid (e.g., glycol) through one or more cooling lines 210 that run proximate to the one or more fluid lines 208. In some examples, a separate cooling line 210 is provided for each fluid line 208. In this manner, the fluid lines 208 can be regulated to respective temperatures (or temperature ranges). In this manner, a first beverage can be regulated at a first temperature range and a second beverage can be regulated at a second temperature range as each travels between the refrigerator 206 and the drum assembly 202.

In the example of FIG. 2, the refrigerator 206 includes a refrigeration system 220, a first tank 222 (e.g., pony keg, keg, barrel), and a second tank 224 (e.g., pony keg, keg, barrel). Although two tanks 222, 224 are depicted, it is contemplated that more or fewer tanks can be included in the refrigerator 206. In some examples, the first tank 222 stores the first beverage, and the second tank 224 stores the second beverage. In some examples, the first tank 222 and the second tank 224 are regulated to respective temperatures (or temperature ranges). In this manner, the first beverage can be regulated at the first temperature range and the second beverage can be regulated at the second temperature range within the refrigerator 206.

In some implementations, the drum assembly 202 includes a drum 230, one or more taps 232, an actuator 234 for each tap 232, and a cooling manifold 236. As described in further detail herein, the drum 230 is rotatable about an axis X-X. As depicted in FIG. 2, each of the one or more fluid lines 208 is coupled to a respective tap 232 through the cooling manifold 236. In this manner, the transition from the fluid line 208 to the tap 232 is cooled. In some implementations, each tap 232 and respective actuator 234 are fixed for rotation with the drum 230 as the drum 230 rotates about the axis X-X. In some implementations, each tap 232 and respective actuator 234 are fixed separate from the drum 230, such that the drum 230 rotates about the axis X-X relative to the each tap 232 and respective actuator 234.

Each actuator 234 can be activated to operate the respective tap 232 and enable fluid flow into a vessel holder of the drum 230. In some examples, the actuator 234 includes a solenoid having a rod that is fixed to the tap 232. In some examples, a signal can be transmitted to the solenoid to induce linear movement of the rod, which in turn mechanically actuates the tap 232 for fluid flow therethrough. In some examples, the rod is moved between a start position (tap closed) and end position (tap open). In some examples, the rod is moved between variable positions including the start position (tap closed), one or more intermediate positions (tap partially open) and the end position (tap open). In this manner, a rate of fluid flow from the tap 232 can be varied for respective beverages. For example, for a first beverage, a first fluid flow is provided through the respective tap 232, and for a second beverage, a second fluid flow is provided through the respective tap 232.

In some implementations, the rate of fluid flow can change during a pour. For example, the tap 232 is actuated to a first position (e.g., tap open, tap partially open) at the beginning of a pour, moves through one or more positions during the pour (e.g., tap gradually closing), and ends at a second position at the end of the pour (e.g., tap closed). In some examples, the move through the one or more positions during the pour can be gradual (e.g., smooth curve). In some examples, the move through the one or more positions during the pour can be incremental (e.g., stepped curve).

In some implementations, a tilt of the vessel varies during a pour, while the rate of fluid flow changes during the pour. For example, the vessel can be at an initial angle (e.g., 45°) when the tap 232 is actuated to the first position, and the vessel gradually tilts to a final angle (e.g., 0° relative to vertical, 90° relative to horizontal) by the end of the pour when the tap 232 is actuated to the second position.

Figure 3A:
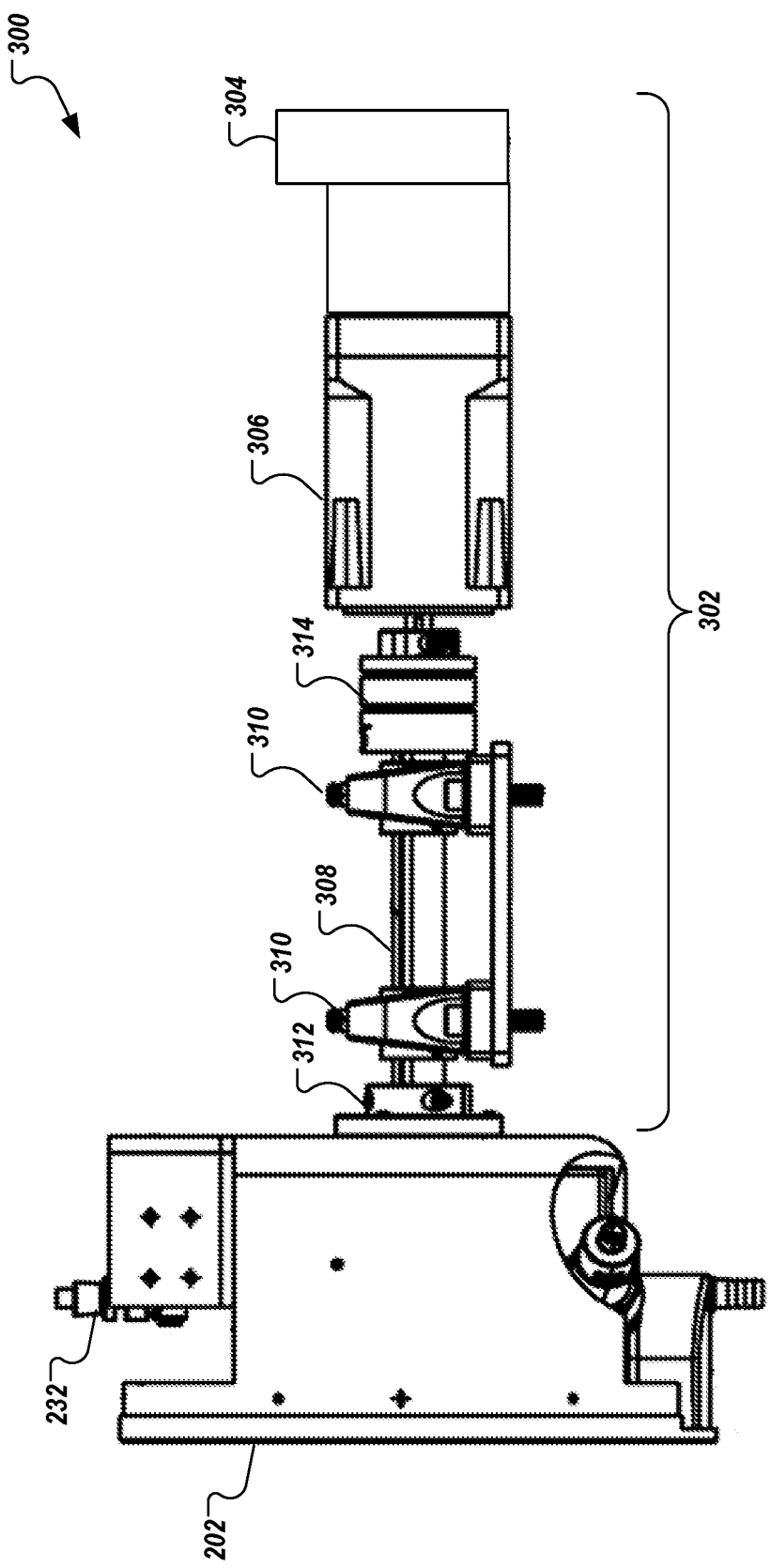

FIGS. 3A-3C depict a drive assembly 300 in accordance with implementations of the present disclosure. The drive assembly 300 includes the drum assembly 202 and a drive train 302. The drive train 302 includes a motor 304, a gearbox 306, a shaft 308, and bearing assemblies 310. The shaft 308 is supported for rotation by the bearing assemblies 310 and is coupled to the drum assembly 202 by a coupler 312 and to the gearbox 306 by a coupler 314. The motor 304 provides torque input to the gearbox 306, which, in turn, provides torque to the shaft 308 through the coupler 314 to drive rotation of the shaft 308. In turn, the shaft 308 drives rotation of the drum assembly 202 through the coupler 312.

Figure 3D:
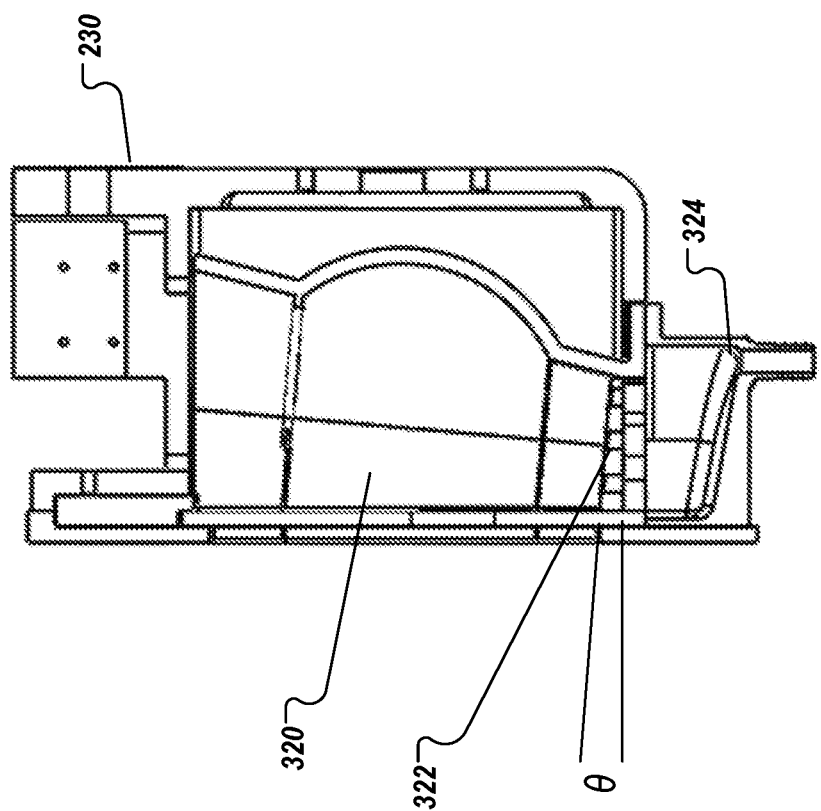
FIG. 3D depicts a cross-section of an example drum of the example drive assembly of FIGS. 3A-3C.

As depicted in FIGS. 3B and 3D, the drum 230 includes a vessel holder 320 that can receive a vessel. In this manner, as the drum 230 is induced to rotate, the vessel therein also rotates, as described in further detail herein. The vessel holder 320 includes a floor 322, on which the vessel rests when resident within the vessel holder 320. In some examples, the floor 322 is at an angle θ relative to horizontal. In some examples, the angle θ is greater than 0° relative to horizontal. In this manner, gravity encourages secure seating of the vessel within the vessel holder 320.

FIGS. 4A-4C depict example rotation of the drum 230 in accordance with implementations of the present disclosure. A vessel 400 is resident within the vessel holder 320. The drum 230 is induced to rotate, driven by the drive train 302. In some examples, and as depicted in FIG. 4B, the drum 230 rotates in a clockwise direction to an angle α. In some examples, the angle α (also referred to as tilt value) is based on the beverage that is to be dispensed into the vessel 400. In some examples, and as depicted in FIG. 4C, the drum 230 rotates in a counter-clockwise direction to an angle β. In some examples, the angle β (also referred to as tilt value) is based on the beverage that is to be dispensed into the vessel 400.

In some examples, the drum 230 rotates in the clockwise direction to initiate a pour from a first tap 232, and rotates to a neutral position (e.g., 90° relative to horizontal) at the end of the pour from the first tap 232. In some examples, the drum 230 rotates in the counter-clockwise direction to initiate a pour from a second tap 232, and rotates to the neutral position (e.g., 90° relative to horizontal) at the end of the pour from the second tap 232.

Figure 5A:
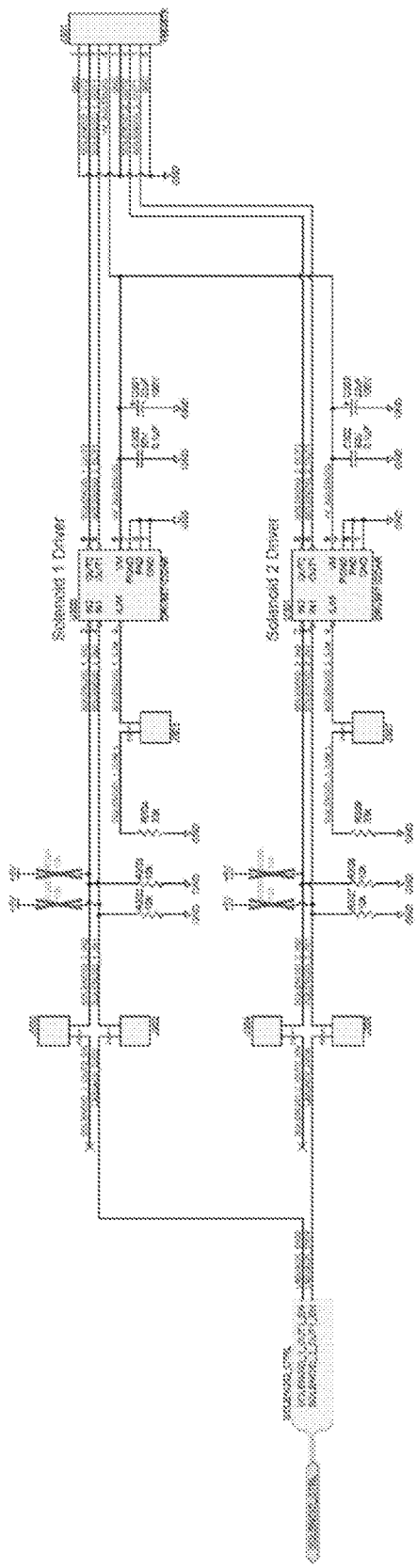
FIGS. 5A and 5B depict example wiring schematics in accordance with implementations of the present disclosure.
Figure 5B:
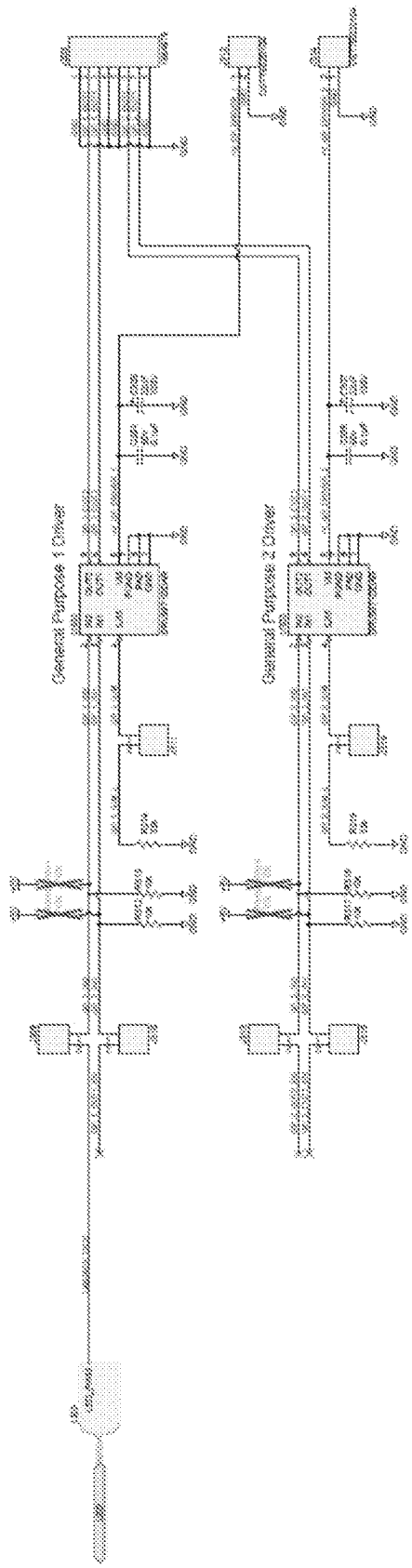

FIGS. 5A and 5B depict example wiring schematics in accordance with implementations of the present disclosure. The example wiring schematics depict wiring for actuation of solenoids to operate the taps 232.

Figure 6:
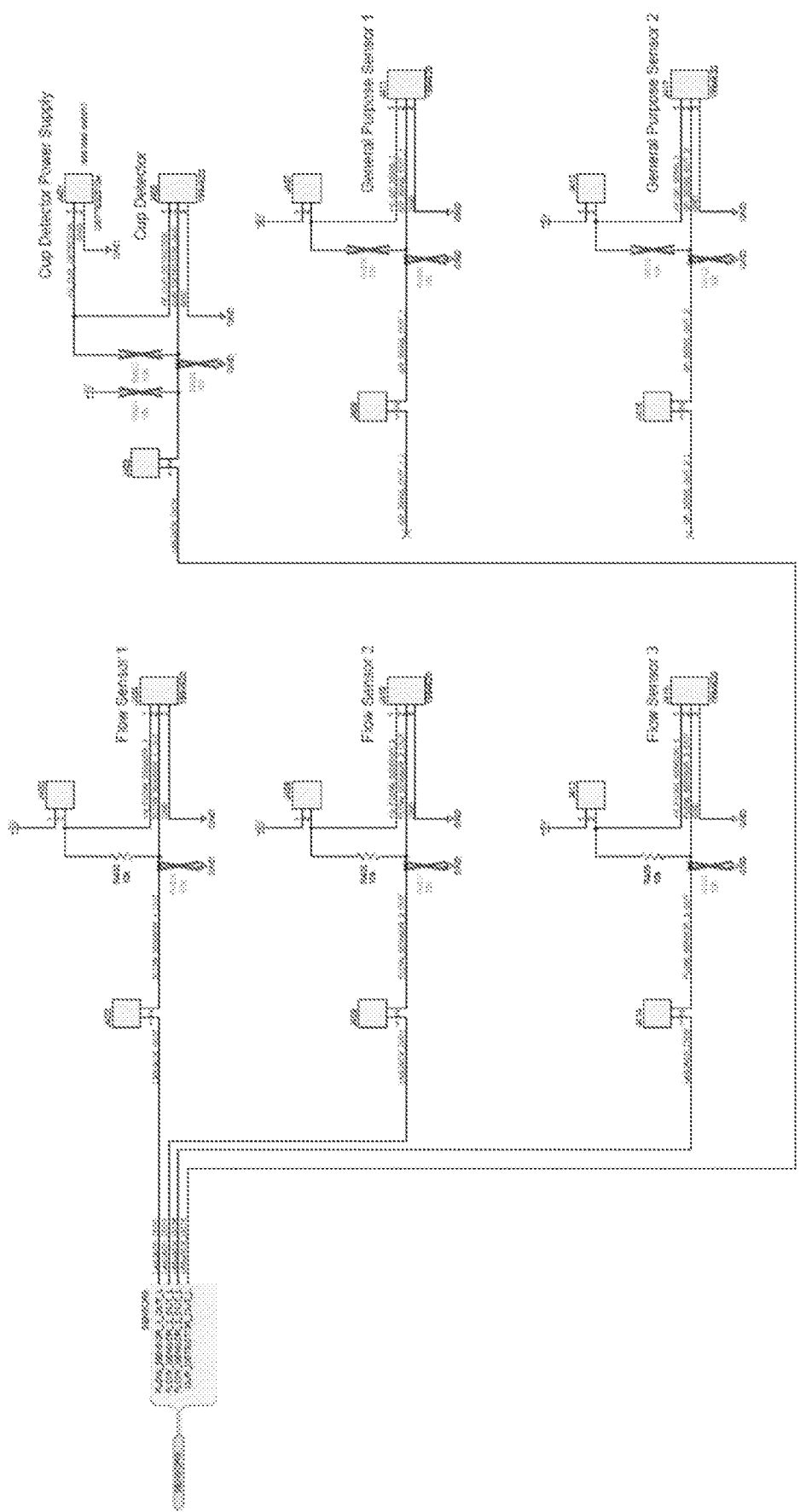
FIG. 6 depicts an example actuator system in accordance with implementations of the present disclosure.

Implementations of the present disclosure further includes a sensor system for generating data responsive to characteristics of the beverage dispensing machine. Example characteristics include, without limitation, presence of a vessel within the vessel holder (e.g., the vessel holder 320 of FIGS. 3A-3C), rotational position of the drum (e.g., tilt of the vessel), flow rate of a beverage through a tap, solenoid position, temperature of the beverage along a fluid line, temperature of the beverage within the refrigerator, refrigerator temperature for respective tanks, tap delivery gas pressure, setting of tap delivery regulator, color of beer within vessel at dispensing, and height of head on beer at delivery. For example, the beverage dispensing machine can include flow rate sensors, temperature sensors, cameras (e.g., still and/or video, thermal), and the like. FIG. 6 depicts an example wiring diagram for example sensors in accordance with implementations of the present disclosure. In some examples, environmental sensors can be provided to generate data responsive to an environment within which the beverage dispensing machine is located (e.g., pressure sensor, humidity sensor, temperature sensor, altitude sensor).

In some implementations, image data can be processed to determine features of the beverage as the beverage is poured into the vessel and/or after the beverage is poured. For example, a camera (e.g., video, still) can be located within the vessel holder to generate image data of the beverage within the vessel. In some examples, the image data is processed to determine the features of the beverage. Example features can include, without limitation, color and head height of the beverage. In some examples, the image data is processed by one or machine learning (ML) models that are trained to determine the features. For example, image data can be provided as input to a ML model and one or more features can be provided as output.

In some implementations, the features can be compared to one or more target features to determine whether the pour is a target pour. For example, the color feature can be compared to a target color feature (e.g., that is specific to the type of beer dispensed) and a difference color value can be determined. In some examples, if the difference color value exceeds a threshold color difference value, the target pour has not been achieved. As another example, the head height feature can be compared to a target head height feature (e.g., that is specific to the type of beer dispensed) and a difference head height value can be determined. In some examples, if the difference head height value exceeds a threshold head height difference value, the target pour has not been achieved.

In some implementations, if the target pour has not been achieved one or more parameters of the beverage dispensing machine can be adjusted in an effort to achieve the target pour in the next dispensing cycle for the particular beverage. For example, one or more of the temperature of the beverage, a gas pressure for dispensing of the beverage, a pour rate of the beverage, a tilt of the vessel during dispensing of the beverage, and/or any other appropriate parameter can be adjusted after the pour. In some examples, adjustment can include changing a current value (e.g., setpoint) to an adjusted value. In this manner, self-tuning of successive pours is provided.

In some implementations, whether the target pour is being achieved can be determined while the beverage is being dispensed in an effort to achieve the target pour upon completion of the pour. For example, one or more of the temperature of the beverage, a gas pressure for dispensing of the beverage, a pour rate of the beverage, a tilt of the vessel during dispensing of the beverage, and/or any other appropriate parameter can be adjusted during the pour. In some examples, adjustment can include changing a current value (e.g., setpoint) to an adjusted value. In this manner, self-tuning of an ongoing pour is provided.

In some implementations, pour parameters and resulting pour features can be collected from one or more beverage dispensing machines. In some examples, the collective data can be analyzed to tune pour parameters in an effort to consistently achieve a target pour for a respective beverage across the one or more beverage dispensing machines. For example, a ML model can be trained based on the collective data to determine pour parameters that can be used for a particular beverage dispensing machine and/or across multiple beverage dispensing machines for a respective beverage.

Implementations of the present disclosure further include automated restocking and supply chain management for beverages dispensed through the beverage dispensing machine. In some implementations, a computing system resident within the beverage dispensing machine can execute functionality (e.g., programmed in one or more computer-executable applications) for automated restocking and supply chain management. In some implementations, the computing system resident within the beverage dispensing machine can communicate with one or more external computing systems (e.g., communicate with one or more servers over a network, such as the Internet) to collectively execute functionality for automated restocking and supply chain management. In some implementations, data can be collected and processed to determine a quantity of beverage remaining, a quality of the remaining beverage, an estimated time until an insufficient amount of beverage remains to serve, and the like. In some examples, automated restocking and supply chain management can be performed at least partially based on one or more of the quantity of beverage remaining, the quality of the remaining beverage, and the estimated time until an insufficient amount of beverage remains to serve.

In some examples, the computing system resident within the beverage dispensing machine and one or more external computing systems can individually, or collectively, execute a supply chain management (SCM) program and/or enterprise resource planning (ERP) program. In some examples, the SCM program and/or the ERP program can perform at least a portion of functionality for automated restocking and supply chain management related to one or more beverage dispensing machines of the present disclosure.

In some implementations, and with regard to quantity, data can include a level of beverage within a tank and can include an amount of beverage dispensed from the beverage dispensing machine. In some examples, the level of beverage within the tank can be determined based on a signal from a level sensor that is responsive to the level of beverage within the tank, and the level can be used to calculate a quantity of beverage within the tank (e.g., based on dimensions of the tank). In some examples, the amount of beverage dispensed from the beverage dispensing machine can be determined based on an aggregation of instances, during which the beverage was dispensed, and, for each instance, a flow rate and duration of flow of dispensing of the beverage.

In some implementations, an order to restock the beverage can be determined at least partially based on the quantity. For example, the quantity can be compared to a threshold quantity, and if the quantity is below the threshold quantity, an order can be made for a replacement tank of the beverage (e.g., the SCM program and/or the ERP program can issue an order to a vendor). In some examples, the threshold quantity is a fixed value. In some examples, the threshold quantity is a dynamic value. For example, the threshold quantity can depend on a rate at which the beverage is dispensed from the beverage dispensing machine (e.g., the threshold quantity can be proportional to the rate). In some examples, for higher rates (e.g., the beverage is relatively more frequently dispensed), the threshold quantity is higher. In some examples, for lower rates (e.g., the beverage is relatively less frequently dispensed), the threshold quantity is lower. In some examples, the threshold quantity can be determined based on a ML model that is trained to determine the threshold quantity. For example, quantity data and rate data can be provided as input to the ML model and the threshold quantity can be provided as output.

In some implementations, the quality of the remaining beverage can be determined and at least partially used for automated restocking and supply chain management. For example, as the beverage is stored in the tank, the quality of the beverage declines over time. The quality of the beverage can be influenced by one or more of time, temperature, and pressure. In some examples, time data, temperature data, and pressure data can be provided as input a ML model that is trained to determine a quality value for the particular type of beverage and provide the quality value as output. In some examples, the quality value changes over time. For example, the quality value can decrease the longer that the beverage remains in the tank. Consequently, the quality value can be periodically determined (e.g., hourly, daily, weekly). In some examples, each of the temperature data and pressure data can be provided as time series data representing respective temperature values and pressure values over time (e.g., since the tank was installed into the beverage dispensing machine). In this manner, changing values over time can be considered in determining the quality value.

In some implementations, data from one or more sensors within the beverage dispensing machine can be used to perform predictive maintenance. For example, one or more sensors within the beverage dispensing machine generate data responsive to operation of components within the beverage dispensing machine. In some examples, the data can be processed by a predictive maintenance program (e.g., by a predictive maintenance program executed by the computing system of the beverage dispensing machine and/or by one or more external computing systems) to identify one or more components that require replacement and/or to predict when one or more components will require replacement. In some examples, maintenance personnel are automatically dispatched to perform maintenance on the beverage dispensing machine, as required.

Figure 7:
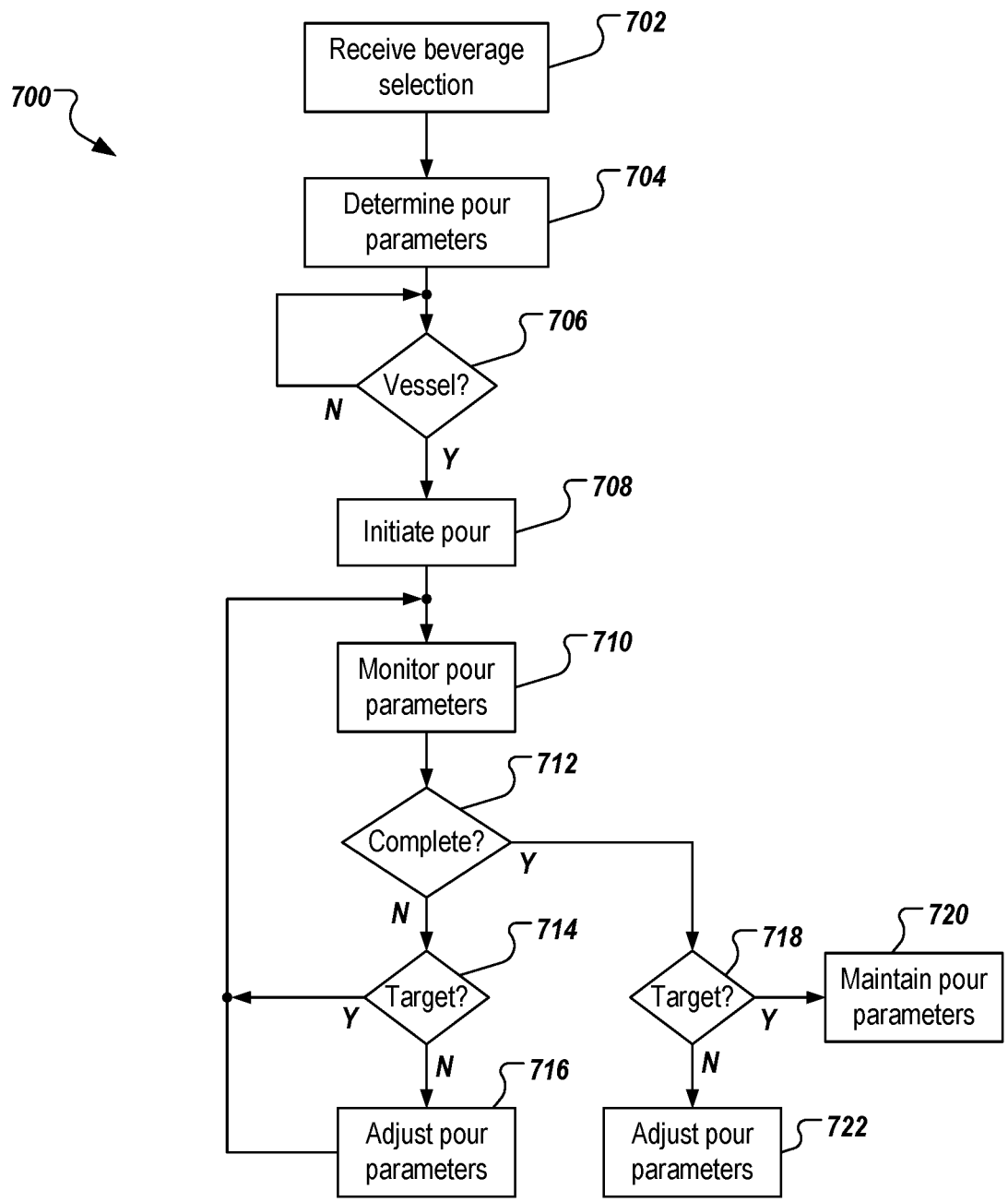
FIG. 7 depicts an example process that can be executed in implementations of the present disclosure.

FIG. 7 depicts an example process 700 that can be executed in implementations of the present disclosure. In some examples, the example process 700 is provided using one or more computer-executable programs executed by one or more computing devices.

A beverage selection is received (702). For example, a consumer selects a beverage from a set of beverages available for dispensing from the beverage dispensing machine. Pour parameters for the beverage are determined (704). For example, a set of pour parameters for the beverage selected can be retrieved from computer-readable memory. Example pour parameters in the set of pour parameters can include, without limitation, tilt, tilt progression during pour, flow rate, and flow rate progression during pour. It is contemplated, however, that the set of pour parameters can include any appropriate pour parameters and combination of pour parameters. It is determined whether a vessel is present in the vessel holder (706). For example, a vessel sensor can be responsive to a presence of a vessel and provide a signal indicating whether a vessel is present. If a vessel is not present, the example process 700 loops back.

If a vessel is present, pouring of the beverage is initiated (708). For example, the drum can rotate to provide a tilt for the pour and a tap for the beverage selected is actuated to initiate flow of the beverage into the vessel from the tap. Pour features are determined (710). For example, and as described herein, image data can be processed to determine features of the beverage as the beverage is poured into the vessel. It is determined whether the pour is complete (712). If the pour is not complete, it is determined whether a target pour is being achieved (714). For example, and as described herein, the features can be compared to one or more target features to determine whether the pour is a target pour. If the target pour is being achieved, the example process 700 loops back. If the target pour is not being achieved, one or more pour parameters are adjusted (716), and the example process 700 loops back.

If the pour is complete, it is determined whether a target pour was achieved (718). For example, the features can be compared to one or more target features to determine whether the pour is a target pour. If the target pour was achieved, the pour parameters for the beverage are maintained (720). If the target pour was achieved, one or more pour parameters are adjusted (722) for use during the next pour of the beverage.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for dispensing beverages from a beverage dispensing machine, the method comprising:
   determining, from computer-readable media, pour parameters for a beverage of a plurality of beverages, the pour parameters being specific to the beverage, at least one pour parameter comprising a tilt value; and
   automatically, by the beverage dispensing machine:
      rotating a drum that holds a vessel to achieve the tilt value, and
      automatically rotating the drum to reduce the tilt value of the vessel based on the pour parameters during dispensing of the beverage, such that the tilt value is substantially zero upon ceasing dispensing of the beverage into the vessel from the tap, wherein at least one pour parameter is adjusted during dispensing in response to determining that a target pour is not being achieved.

2. The method of claim 1, wherein the pour parameters further comprise a flow rate and the beverage is dispensed substantially at the flow rate.

3. The method of claim 1, wherein the pour parameters further comprise a variable flow rate and the beverage is dispensed at a flow rate that varies based on the variable flow rate during dispensing.

4. The method of claim 1, wherein the drum rotates in a first direction for any beverage dispensed.

5. The method of claim 1, wherein the drum rotates in a first direction for a first beverage that is dispensed and rotates in a second direction for a second beverage that is dispensed, the second direction different from the first direction.

6. The method of claim 1, further comprising providing data used to determine features of the beverage of the beverage and adjusting one or more pour parameters based on at least one feature.

7. The method of claim 1, wherein the one or more pour parameters are adjusted during dispensing of the beverage.

8. A beverage dispensing system, comprising:
   a beverage dispenser; and
   a computer-readable storage device coupled to one or more processors and having instructions stored thereon which, when executed by the one or more processors, cause the one or more processors to perform operations for dispensing beverages from a beverage dispensing machine, the operations comprising:
      determining, from computer-readable media, pour parameters for a beverage of a plurality of beverages, the pour parameters being specific to the beverage, at least one pour parameter comprising a tilt value; and
      automatically, by the beverage dispensing machine:
         rotating a drum that holds a vessel to achieve the tilt value, and
         automatically rotating the drum to reduce the tilt value of the vessel based on the pour parameters during dispensing of the beverage, such that the tilt value is substantially zero upon ceasing dispensing of the beverage into the vessel from the tap, wherein at least one pour parameter is adjusted during dispensing in response to determining that a target pour is not being achieved.

9. The beverage dispensing system of claim 8, wherein the pour parameters further comprise a flow rate and the beverage is dispensed substantially at the flow rate.

10. The beverage dispensing system of claim 8, wherein the pour parameters further comprise a variable flow rate and the beverage is dispensed at a flow rate that varies based on the variable flow rate during dispensing.

11. The beverage dispensing system of claim 8, wherein the drum rotates in a first direction for any beverage dispensed.

12. The beverage dispensing system of claim 8, wherein the drum rotates in a first direction for a first beverage that is dispensed and rotates in a second direction for a second beverage that is dispensed, the second direction different from the first direction.

13. The beverage dispensing system of claim 8, wherein operations further comprise providing data used to determine features of the beverage of the beverage and adjusting one or more pour parameters based on at least one feature.

14. The beverage dispensing system of claim 8, wherein the one or more pour parameters are adjusted during dispensing of the beverage.

15. Computer-readable storage media coupled to one or more processors and having instructions stored thereon which, when executed by the one or more processors, cause the one or more processors to perform operations for dispensing beverages from a beverage dispensing machine, the operations comprising:
   determining, from computer-readable memory, pour parameters for a beverage of a plurality of beverages, the pour parameters being specific to the beverage, at least one pour parameter comprising a tilt value; and
   automatically, by the beverage dispensing machine:

rotating a drum that holds a vessel to achieve the tilt value, and automatically rotating the drum to reduce the tilt value of the vessel based on the pour parameters during dispensing of the beverage, such that the tilt value is substantially zero upon ceasing dispensing of the beverage into the vessel from the tap, wherein at least one pour parameter is adjusted during dispensing in response to determining that a target pour is not being achieved.

16. The computer-readable storage media of claim 15, wherein the pour parameters further comprise a flow rate and the beverage is dispensed substantially at the flow rate.

17. The computer-readable storage media of claim 15, wherein the pour parameters further comprise a variable flow rate and the beverage is dispensed at a flow rate that varies based on the variable flow rate during dispensing.

18. The computer-readable storage media of claim 15, wherein the drum rotates in a first direction for any beverage dispensed.

19. The computer-readable storage media of claim 15, wherein the drum rotates in a first direction for a first beverage that is dispensed and rotates in a second direction for a second beverage that is dispensed, the second direction different from the first direction.

20. The computer-readable storage media of claim 15, wherein operations further comprise providing data used to determine features of the beverage of the beverage and adjusting one or more pour parameters based on at least one feature.

* * * * *

UNITED STATES PATENT AND TRADEMARK OFFICE
CERTIFICATE OF CORRECTION

PATENT NO. : 10,988,365 B2
APPLICATION NO. : 16/984944
DATED : April 27, 2021
INVENTOR(S) : Evan Isaac Timerding Gant et al.

Page 1 of 1

It is certified that error appears in the above-identified patent and that said Letters Patent is hereby corrected as shown below:

In the Claims

In Claim 6, Column 14, Lines 7-8, delete "of the beverage of the beverage" and insert -- of the beverage --, therefor.

In Claim 13, Column 14, Line 52, delete "of the beverage of the beverage" and insert -- of the beverage --, therefor.

In Claim 20, Column 15, Line 28, delete "of the beverage of the beverage" and insert -- of the beverage --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*